April 14, 1953  C. JOHNSON  2,634,644
MACHINE TOOL CONTROL
Filed Nov. 16, 1946  2 SHEETS—SHEET 1

INVENTOR.
CLARENCE JOHNSON
BY Raymond D. Jenkins
ATTORNEY

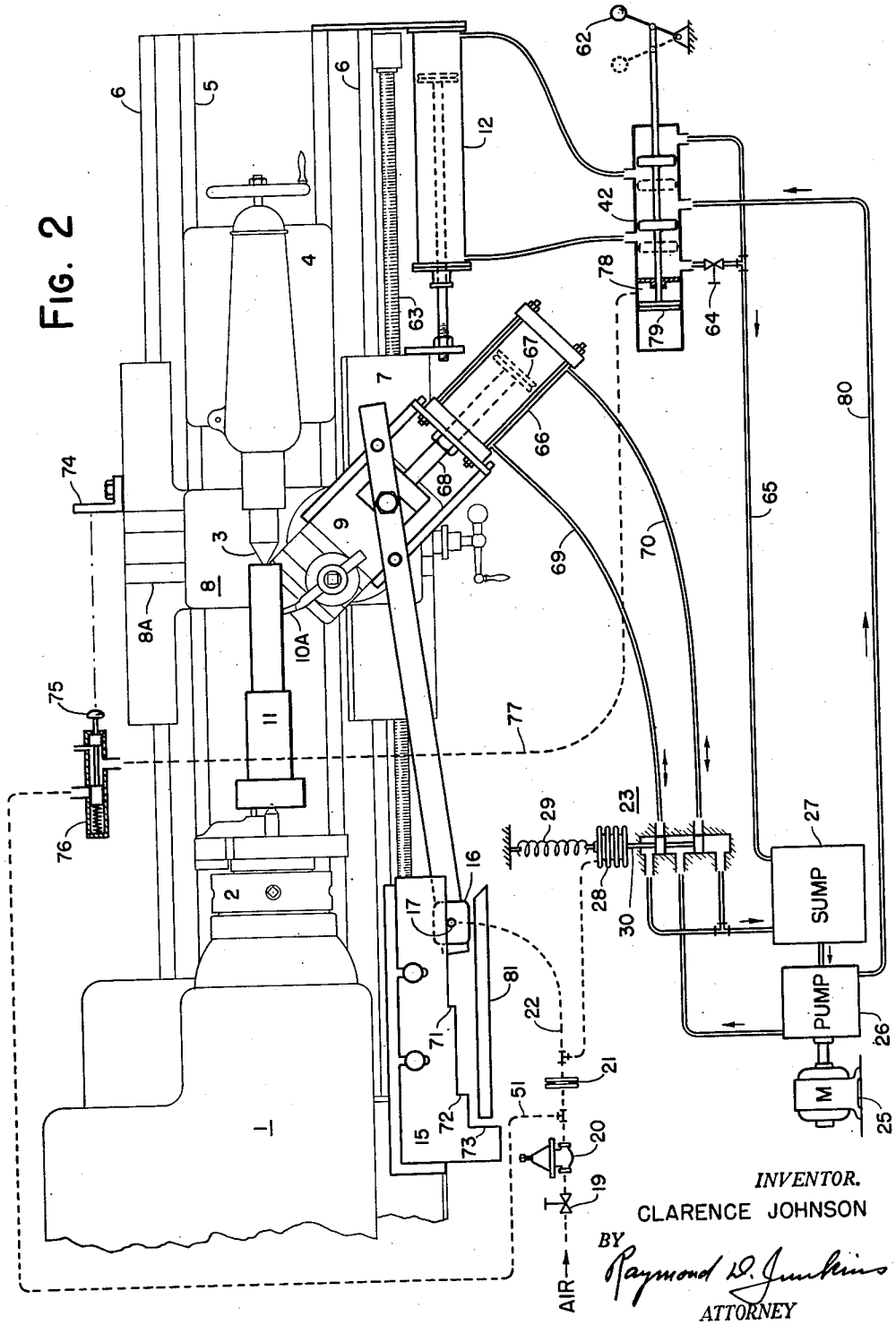

Patented Apr. 14, 1953

2,634,644

UNITED STATES PATENT OFFICE 2,634,644

MACHINE TOOL CONTROL

Clarence Johnson, Orfordville, Wis., assignor to Bailey Meter Company, a corporation of Delaware Application November 16, 1946, Serial No. 710,248

6 Claims. (Cl. 82—14)

My invention relates to the art of contour control or object duplication and is particularly directed to the provision of apparatus, systems and methods for material forming or shaping machines whereby a work piece is formed to a contour or configuration determined by a master, pattern, template, or the like, which dictates the desired configuation.

Specifically, although not limited thereto, the present disclosure is directed to the control and operation of a metal working lathe wherein a tracer scans a relatively thin plate template so shaped as to dictate the desired contour or shape of the finished work piece.

In simplest language, the tracer which scans the pattern provides a valve or port bleeding a pressure fluid, such as compressed air, to the atmosphere from a substantially constant pressure source. The rate of bleed to the atmosphere is determined by the freedom of the port under the dictates of the tracer and pattern. The rate of flow of the air to the atmosphere through the port and the consequent variations in pressure of the air due to such variations in rate of discharge are utilized through improved relay mechanisms to control fluid motors for power operation of the machine. Preferably the fluid motors are actuated by an hydraulic fluid, such as oil, and the motors may be piston-cylinder combinations or rotary fluid motors.

The general purpose accomplished by the power devices is to relatively move the tracer and tool in regard to the pattern and work piece. Such a system combines and utilizes the many advantages of an air tracer operating at relatively low pressure with hydraulic power devices operating at relatively high pressures for stability and power.

A preferred form of my invention employs a tracer discharging air under pressure of the order of 35 p. s. i. freely to the atmosphere at a controllable rate. The back pressure resultant is utilized in a simple relay mechanism to control oil as a hydraulic fluid under a pressure in the order of 300 p. s. i. for positioning power devices. Thus I combine the advantageous features of air discharging freely to the atmosphere in a tracer mechanism with the advantages of a relatively higher pressure incompressible fluid for the power devices. My preferred tracer is of a relatively small size and simplicity as compared to known liquid tracers previously mentioned.

Obviously a contour control or object duplicator of the type forming the subject matter of my present invention may be employed with material forming or shaping machines or machine tools of various types, such as milling machines, lathes, slotters, planers, die sinking machines, or other machines in which the relative speed between the tool and the work may be suitably controlled. I have chosen to illustrate and describe my invention as applied particularly to metal turning engine lathes. Further applications and modifications of my invention will be readily apparent.

In the present embodiment I have found it desirable to utilize a relatively thin plate template which may readily be constructed and later stored.

In general, the pattern dictates the desired shape of the work piece. I use profile and contour interchangeably. The pattern has the desired shape, although not necessarily the exact shape.

A particular object of the present invention is to provide the improvement including a relatively completely automatic cycle of machining operation, particularly in a lathe. The normal cutting traverse of the work, by the tool, is followed by a relatively high speed return of the tool to starting position. Such cycle is completed automatically and the tool stops its travel when it has returned to its initial position and is ready for a second cut (if necessary) over the work. A further object of the invention is to provide two separate patterns or templates, one of which through the tracer assembly controls the working stroke of the carriage of a lathe and the other of which controls the return stroke of the carriage to the starting position.

Further objects and advantages of the present invention will be apparent from a study of the specification to follow.

In the drawings:

Fig. 2 is a somewhat similar diagrammatic view of another embodiment of my invention.

Figure 1:
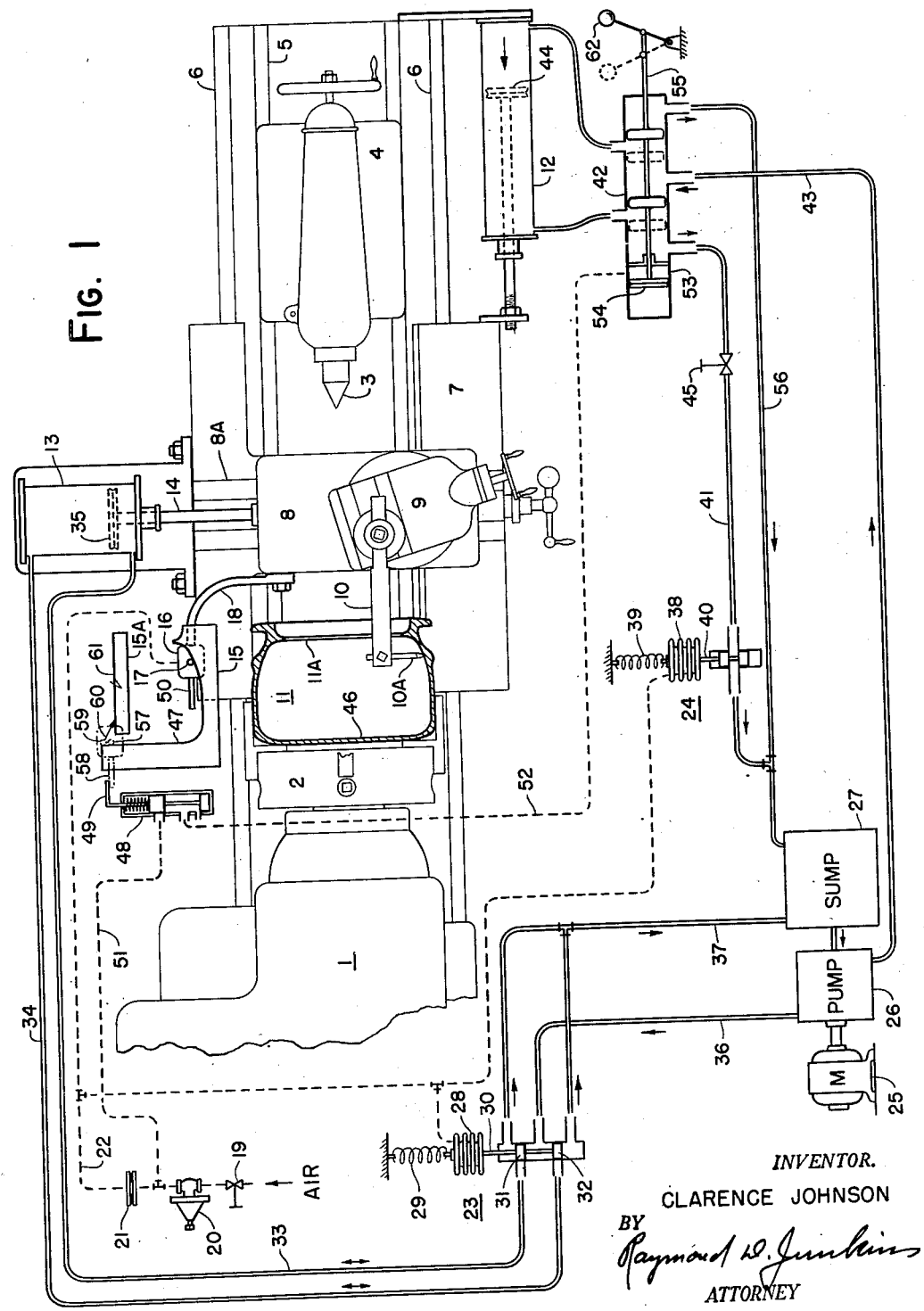
Fig. 1 is a somewhat diagrammatic plan view of an engine lathe showing particularly the template, work piece, tracer, and power positioning means for the tool.

Referring now to Fig. 1, I show my invention applied to an engine lathe 1 having a head stock 2 adapted to be rotated by any suitable means. A carriage 4 is movable longitudinally along the bed of the lathe on suitable ways 5 and supports a tail stock 3 utilized for supporting certain types of work pieces. Also movable longitudinally along the bed of the lathe on suitable ways 6 is a carriage 7 upon which is mounted a cross-slide 8 movable on ways 8A transversely of the bed of the lathe.

Mounted on and carried by the cross-slide 8 is an angularly positionable compound rest 9 forming a tool support for a boring bar 10 carrying a tool 10A. Movements of the tool 10A relative to a work piece 11 are produced through the agency of an hydraulic power device 12 acting longitudinally and through the agency of an hydraulically actuated power device 13 adapted to position the cross-slide 8 transversely along the ways 8A. The hydraulic device 13 is supported by the carriage 7 in a manner such that its piston rod 14 will position the cross-slide 8, compound 9, and tool 10A transversely of the lathe along the ways 8A, while the entire unit 13 is positioned with the carriage 7 axially of the lathe by the power device 12.

In the present embodiment I have illustrated the work piece 11 in section as a metallic container having an opening 11A through which the boring bar 10 and tool 10A are inserted for machining the interior of the work piece to a contour dictated by the shape of a master or template 15. The work piece 11 is suitably supported for rotation by and with the head stock 2, and in the present example the tail stock 3 is not utilized. Rotation of the work 11 is accomplished in usual manner at a selected speed through means not shown.

It will be evident that to machine the interior contour of the work piece 11 it is necessary for the tool 10A to be moved through a certain path longitudinally of the lathe dictated by the desired configuration of the interior side wall. In transverse movement however the tool 10A will not need to cross the center line of work rotation, and therefore the master or template 15 reproduces only one-half the interior section shape of the work 11. The template 15 is preferably of the thin plate type and specificially may be made of stainless steel or Monel metal approximately one-sixteenth to one-eighth inch in thickness.

In conjunction with the template 15 I show another template portion 15A whose purpose will be later explained. I have, in Fig. 1, not shown any means for supporting the template portions 15, 15A, as I feel that this is unnecessary and would be confusing. It will be understood that they are preferably supported from the bed of the lathe in any desirable manner and in such a manner that the complete cycle movement of the tracer assembly will not be interfered with. Inasmuch as the present drawing is more or less diagrammatic, it appears unnecessary to go into such detail when supporting means are well known expedients.

Cooperating with the template 15 is a tracer body 16 having a tracer arm or feeler 17 adapted to engage the shaped edge of the template 15 in a scanning traverse thereover. The assembly 16, 17 is supported by a bracket arm 18 from the cross-slide 8 so that the tracer travels longitudinally with the carriage 7 and transversely with the cross-slide 8. Thus the tracer 16, 17 moves with the tool 10A along two angularly related paths in the same plane.

The tracer 16 is of the type disclosed and claimed in the patent of Frederick A. Barnes, Patent No. 2,436,373, issued February 24, 1948, entitled "Machine Tool Control," and in general provides a construction having a two-element valve continually discharging air in variable degree to the atmosphere from a normally constant pressure source. One of the elements of the valve is included in the housing 16 while a second element, movable relative to the first element, is carried by the feeler arm 17. Deflection or movement of the feeler 17, relative to the housing 16, causes a relative positioning of the two elements of the bleed valve and thereby a controllable variation in the rate of discharge of air to the atmosphere, thus establishing a fluid pressure for control purposes.

Air under pressure is available at a shutoff valve 19, through a pressure reducing valve 20, an orifice 21, to the pipe 22 which joins the tracer 16. Variations in rate of discharge of air to the atmosphere from the tracer 16, 17 varies the pressure within the pipe 22 to the end that the pressure within said pipe is directly related to the deflection of the feeler arm 17, and thus to the shape of the template 15.

The air pressure available within the pipe 22 is simultaneously effective upon a relay valve 23 and a variable fluid resistance 24, the former arranged to control the hydraulic motor 13, while the latter controls the hydraulic motor 12. Thus air pressure, established by the tracer 16, and effective within the pipe 22, controls the longitudinal and transverse positioning of the tool 10A and of the tracer 16, 17. The action in positioning the tracer is in the nature of a follow-up, so that the tracer is always attempting to move itself in a direction to return pressure within the pipe 22 to a predetermined "normal" value.

When the tracer 16 is in such a position that the tracer arm 17 is not contacting the edge of the template 15 (as will be the condition if the tracer 16, 17 is moved slightly upwardly on the drawing Fig. 1) it is in what I term an "idle" or uninfluenced position with respect to the tracer body. Under this condition the air bleed valve is so biased as to result in motion of the tracer assembly toward the template. This movement continues until the template is contacted by the feeler and deflects the latter slightly to a "normal" position. Such deflection changes the bleed rate to a value (about 35 p. s. i.) stopping transverse motion of the cross-slide, tool and tracer assembly while producing longitudinal travel at maximum rate. The result is cylindrical turning if the tool is contacting the work and will persist as long as the feeler scans the straight profile and the template parallels the axis of the work piece.

For supplying oil under relatively high pressure (about 300 p. s. i.) I provide a motor 25 driving a pump 26, which latter draws its supply of oil from a sump 27.

The relay 23 includes a pressure sensitive bellows 28 loaded by a spring 29 and for positioning a pilot stem 30 having two lands 31, 32. In Fig. 1 the assembly is shown in such a position that the lands 31, 32 close off pipes 33, 34 which are connected to the opposite ends of the cylinder 13. Thus, under this condition, the piston 35 is locked against travel, as would be the situation for cylindrical turning wherein the tool 10A is not moved in either direction transversely of the center of rotation of the work 11.

If the pilot stem 30 is moved upwardly, then oil under pressure from the pump 26 passes through the supply pipe 36 to the pipe 33 while oil from the pipe 34 drains through the pipe 37 to the sump, resulting in an upward positioning of the piston 35. Conversely a downward positioning of the pilot stem 30 results in a downward positioning of the piston 35. Thus it will be seen that when the tracer assembly 16, 17 is in what I term the "normal" position, as effected by the feeler arm 17 contacting an edge of the tracer 15 parallel to the axis of the lathe, then the lands 31, 32 lock the piston 35 against transverse positioning of the tool 10A and the tool performs a cylindrical cutting operation.

If the contacted edge of the template 15 is slightly inclined in one direction or the other, then as the feeler 17 scans said incline there is a slightly greater, or slightly lesser, pressure within the pipe 22, resulting in a slow travel of the piston 35 either upwardly, or downwardly, in the drawing, and the tool 10A cuts to a slow taper in desired direction.

In the present embodiment the tracer 16 simultaneously controls the fluid motor 12 through the agency of the variable fluid resistance 24. Said resistance includes a pressure sensitive bellows 38, loaded by a spring 39, for the vertical positioning of a pilot stem 40 which has two lands as shown. The lands are spaced across a passage included in the pipe 41 to the end that either upward or downward positioning of the stem 40 produces a restriction in flow of fluid through the pipe 41 to the sump 27.

The pipe 41 joins the left-hand end of the cylinder 12 through a two-position valve 42 which will be referred to later. The right-hand end of the cylinder 12 is joined, by way of a pipe 43, with the pump 26. As shown in Fig. 1, a cutting traverse of the boring tool 10A is from right to left and thus normal travel of the piston 44 is from right to left. While the instantaneous speed of longitudinal travel of the carriage 7 is controlled by the restrictor 40 the maximum speed which can be attained is controlled by a hand throttle valve 45, which limits the drainage of oil from the left-hand end of the cylinder 12 irrespective of positioning of the pilot stem 40.

Air pressure available within the pipe 22 as determined by the interrelation of the elements 16, 17, is effective within the bellows 38 for positioning the pilot stem 40. Thus the speed of longitudinal travel, from right to left, of the carriage 7, is dependent upon the pressure established by the tracer 16. When the tracer arm 17 is contacting a straight edge of the template 15, parallel to the axis of the lathe, there is no transverse positioning of the tool 10A and longitudinal travel of the tool 10A from right to left is at a maximum uniform speed as adjusted by the position of the valve 45.

Thus it will be seen that the tracer 16 simultaneously controls the power devices 12, 13 and thereby the longitudinal and transverse positioning of the tool 10A. At the same time the tracer 16, 17, carried by and with the cross-slide 8 along its two paths of travel, is positioned in a follow-up direction, always attempting to establish a "normal" condition of pressure within the pipe 22.

It is to be noted that the bleed of oil from the left-hand end of the cylinder 12 is at a "maximum" rate when the tracer arm 17 is traveling a straight edge of the pattern 15 parallel to the axis of the lathe. If such straight edge departs in either direction as by gradually approaching, or gradually departing from, the said lathe axis, then under either such condition the stem 40 tends to restrict the flow through the pipe 41 and consequently to slow down the rate of longitudinal travel of the carriage 7. This approaches a condition of complete shutoff and thereby complete stoppage of longitudinal travel of the tool 10A. Assuming for example that the bottom 46 of the work piece 11 is a straight line normal to the axis of the lathe, as represented by the straight line 47 on the pattern 15, as the tracer arm 17, moving from right to left, engages the straight portion 17 of the pattern 15 normal to the axis of the lathe a pressure relation within the assembly 16, 17 is established, such that the pilot 40 completely shuts off passage from the pipe 41 and longitudinal travel of the carriage 7 is stopped, while transverse travel of the cross-slide 8 (upwardly in Fig. 1) is at a maximum rate.

A particular feature of the present invention includes a retracting of the tool from the work piece after a machining traverse has been accomplished, followed by a more rapid return of the tool to starting position, or a complete closed cycle operation, of which a portion of the cycle is a machining cut at speed controlled by the interrelation of the tracer 16 with the pattern 15, while the remainder of the cycle is a relatively high speed return of the tool and tracer to starting position. To accomplish this operation I provide a spring loaded pilot valve 48 having an arm 49 engageable by a projection 50 which is fastened to the tracer 16. Thus, at a certain point 58 in the travel of the tracer, the projection 50 will engage the arm 49 and lift it, against the spring action, thereby opening communication for relatively high pressure air between a pipe 51 and a pipe 52 to make said high pressure air available within a cylinder 53 for positioning a piston 54 and piston rod 55 from the position shown in Fig. 1 to an alternate position toward the left as represented by dotted line.

In said alternate position it will be observed that the pipe 41 is blocked from communication with the cylinder 12 whereas the pipe 43, containing oil under high pressure, is made available to the left-hand end of the cylinder 12. The right-hand end of the cylinder 12 is allowed to communicate with a drain pipe 56, connecting to the sump 27. Under this condition the piston 44 is urged from left to right and its rate of travel is uninhibited by either the pilot stem 40 or the hand valve 45. Thus the carriage 7 is retracted from left to right at maximum speed.

The operation is as follows:

Assume the conditions illustrated in Fig. 1. The cross-slide 8 (and consequently the tool 10A and tracer 16) is positioned transversely of the axis of the lathe by the power device 13 while being moved longitudinally of the lathe from right to left; both under the dictates of the template 15 as scanned by the tracer arm 17. As the arm 17 follows the shaped edge of the template 15 it reaches that portion indicated at 47 whereupon further longitudinal travel from right to left ceases. Transverse travel, however, continues until the tracer arm 17 reaches some location 57 nearly to the end of the surface 47. At location 57 the extension 50 (carried by the bracket 18 with the tracer 16) assumes the dotted position 58 wherein it engages the arm 49 and begins to move the same upwardly against the spring. Upon slight additional movement the tracer arm 17 reaches location 59 while extension 58 has moved the arm 49 sufficient to allow communication between the pipes 51, 52 for admitting relatively high pressure air to the cylinder 53 effective upon the piston 54. The piston 54 moves to the left carrying with it the piston rod 55 thereby switching connections to the cylinder 12 as previously explained. Immediately the piston 44, and carriage 7, begins to move at relatively high speed from left to right. As the tracer arm 17 leaves the surface 47 (away from location 59) the tracer ceases to be influenced by the edge 47 and motion of the piston 35 begins in a direction downward on the drawing Fig. 1. The resultant travel of the feeler arm 17 from the position 59 is along the path of the arrow 60 until the feeler arm 17 engages the edge 61 of the template portion 15A. Such engagement deflects the feeler arm 17, relative to the body 16, to influence the pressure in the pipe 22 to a degree locking the piston 35 against further travel in a transverse direction. The piston 44, however, continues to move at a uniformly high speed from left to right so that the tracer 17 follows the edge 61 to its right-hand end. As it "falls off" the end of the bar 15A (downwardly on the drawing) the piston 44 has reached its extreme travel toward the right as limited by necessary adjustable travel limits. The tracer continues to move from the end of the portion 15A toward the right-hand end of the pattern 15 and, inasmuch as the portion 15A does not extend to the right so far as does the right-hand end of the portion 15, transverse movement of the tracer arm 17 downwardly will cause it eventually to engage the right-hand end of the surface 47 at the initial or starting position.

Longitudinal movement of the carriage 7 toward the right has ceased. Transverse movement of the cross-slide 8 downwardly on the drawing has ceased when feeler arm 17 engages the shaped edge of the template 15. There is no urge for movement in either direction and both longitudinal and transverse travel are stopped. The tracer arm 17 has stopped at the beginning of its traverse of the edge 47 while the tool 10A has stopped at the beginning of its cutting traverse over the work. When it is desired to take another cutting traverse across the work the operator moves the tool into the work the necessary amount through adjustment of the compound rest 9 (the work still being rotated) and then moves the handle 62 from the dotted position to the solid position, thus placing the system again under complete pattern-tracer control of both longitudinal and transverse positioning.

It will be observed that as the tracer 17 travels the path 60, 61 the extension 50 has left contact with the arm 49, with the result that the spring has retracted the land of the device 48 to the position shown on the drawing, wherein communication of the pipe 51 is blocked, while pipe 52 is opened to the atmosphere, thus relieving pressure within the cylinder 53 so that the parts 54, 55 can be moved toward the right when the handle 62 is moved by hand from dotted to solid position on the drawing.

In Fig. 2 I show a further embodiment of my invention wherein the lead screw 63 has been declutched and normal longitudinal movement of the carriage 7 from right to left is accomplished by the fluid motor 12 at a uniform speed determined by the opening of the hand throttle valve 64 in the pipe 65 draining oil from the left-hand end of the cylinder 12 to the sump 27. It will be observed, however, that in this embodiment I have not inserted in the drain pipe 65 a variable fluid resistance such as 24 (Fig. 1) under the control of the tracer 16. In other words, during the cutting traverse of the work by the tool 10A, and the simultaneous scanning of the template 15 by the tracer arm 17, there is no tracer-pattern control of the cylinder 12, but the speed of travel of the carriage is entirely under the control of the hand adjusted throttle valve 64 in the bleed line 65.

Mounted on and carried by the cross-slide 8 is an angularly positionable compound rest 9 forming a tool support for the tool 10A. Movements of the tool 10A relative to the work piece 11 are produced through the agency of the fluid motor 12 previously mentioned and through the agency of an hydraulic cylinder 66 having a piston 67 adapted to position the tool 10A through the agency of a piston rod 68. The hydraulic cylinder 66, piston 67, and piston rod 68 are supported by and carried by the compound 9, angularly positionable therewith, positionable by and with the cross-slide 8 transversely of the axis of the lathe, and carried by the carriage 7 longitudinally of the lathe when the carriage 7 is so positioned through the agency of the fluid motor 12.

It will be understood that the top slide of the compound 9 (which carries the tool 10A) is positionable relative to that portion of the compound 9 fixed to the cross-slide 8, through the agency of the piston rod 68. If the angularly positionable upper portion of the compound 9 is so turned that the axis of the piston rod 68 is normal to the axis of the work piece and lathe, then transverse movement of the cross-slide 8 will result in transverse positioning of the tool 10A normal to the axis of the work piece. If, however, the angularly positionable upper portion of the compound 9 is so moved that its center line (as in Fig. 2) is at an angle of 45° with the axis of the work piece, then (with no longitudinal movement of the carriage 7) the tool may be moved toward or away from the work piece 11 through the agency of the piston 67 at an angle of 45° to the axis of the work piece.

While I have, by way of example, illustrated this angular relation in Fig. 2 as being 45°, it is apparent that other angular relationships may under certain conditions be more advantageous. The exact angular relationship depends upon various things, such as the desired shape and finish of the work piece, the speed of the fluid motor 12, and the speed of travel of the piston rod 68. The speed of travel of the piston 67 in the cylinder 66 is preferably several times faster than the speed of travel of the carriage 7 by the motor 12. If the piston 67 speed is fast enough relative to the carriage, then the cutting of the work is dependent only upon the template 15.

In the present example I preferably travel the carriage 7 from right to left at a uniform speed determined by the opening of the hand throttle valve 64. The tool 10A is moved toward or away from the axis of the work piece by the piston rod 68. The resultant positioning of the tool 10A relative to the work piece is a vector resultant of the two motions. By proper choice of the speed of such movement the work piece 11 may be turned to a taper or to have straight shoulders normal to the axis of the work piece.

As in Fig. 1 air is available under controlled pressure in a pipe 51 ahead of an orifice 21. Air in a pipe 22 is at a pressure determined by the interrelation of the tracer arm 17 with the template 15. Such air pressure, effective upon the bellows 28 of the relay 23, controls the supply and drainage of oil to and from the cylinder 66 for positioning the piston 67 and piston rod 68. As shown in Fig. 2 (a condition of cylindrical turning), the pilot stem 30 is in a blocking position across the pipes 69, 70 leading to opposite ends of the cylinder 66. Thus there is, as shown in Fig. 2, no transverse movement of the tool 10A, while with continued uniform speed movement of the carriage 7 the result is a cylindrical turning of the work 11.

When the shoulder 71 on the pattern 15 is encountered by the tracer arm 17, said tracer arm is deflected, relative to the tracer body 16, varying the pressure within the pipe 22 to a degree such that the relay 23 slightly opens passage of oil under pressure through the pipe 69 and slightly opens drainage from the pipe 70 to the sump. The result is a slow retraction of the piston 67 toward the lower right-hand corner of the drawing. At properly chosen speeds of the various parts the said retraction of the piston 67 in relation to a continued movement of the carriage 7 (through the agency of the motor 12) results in the tool 10A backing away from the work 11 along a path normal to the axis of said work, and thereby machining a sharp shoulder 71 upon the work in conformity with the dictates of the pattern 15.

In similar manner another shoulder 72 on the template 15 may be accomplished and eventually the shoulder 73 will be reached. This shoulder extends beyond any possibility of an equivalent machining upon the work 11. In other words, it extends far enough so that the tool 10A will be backed completely away from the work. As such an excessive backing operation is accomplished (the longitudinal movement of the carriage 7 from right to left having continued) the extension 74 of the carriage 7 will engage the knob 75 of the relay device 76 and depress the same against its spring loading to the end that communication will be established between the pipes 51 and 77, whereupon air under relatively high pressure will be admitted to the cylinder 78, effective upon the piston 79, for moving the same toward the left until certain portions of the two-way valve 42 are moved to their dotted position. In such position (as explained in connection with Fig. 1) communication is closed off between the left-hand end of the cylinder 12 and the drain pipe 65, whereas communication is established between the said left-hand end of the cylinder and the high pressure oil pipe 80. The result is the application of high pressure oil upon the left-hand end of the cylinder 12 and relief of the right-hand end of said cylinder to the drain pipe 65 uninhibited by the hand throttle valve 64. The tracer arm 17 leaves the surface 73 and engages the outer left-hand end of the surface 81, thereafter following the edge 81 under the dictates of the high speed longitudinal travel of the motor 12 from left to right. The tracer arm 17 following along the straight path 81 does not influence the piston 67 to move in the cylinder 66 until the right-hand end of the edge 81 is reached. As the tracer arm 17 falls off from the sharp edge of the beveled end toward the axis of the lathe, the pressure within the pipe 22 is such as to cause the piston 67 to move toward the upper left-hand corner of the drawing sheet. At the same time longitudinal movement of the carriage 7 toward the right has ceased because the piston of the motor 12 has reached its limit of travel. Movement of the tracer arm 17 will cease when it reaches a position as shown in solid line on Fig. 2, which is substantially the beginning of its cutting traverse. As the tracer arm 17 engages the shaped edge of the template 15 it is deflected, relative to the tracer 16, to an extent whereby the pilot stem 30 is moved to the shown shutoff position. Thus, further movement of the piston 67 is locked.

The mechanism remains in the position shown in Fig. 2, which is the position of the start of the cutting traverse across the work. When it is desired to take a further cut across the work the tool is moved into cutting engagement with the rotating work, the handle 62 is thrown to its dotted position and the previously described cutting traverse and high speed retraction to starting point is accomplished.

While I have illustrated and described certain preferred embodiments of my invention, it will be understood that this is by way of example only.

What I claim as new, and desire to secure by Letters Patent of the United States, is:

1. In combination with a machine tool having a frame, a workholder and a toolholder, one of said holders being movable on said frame along first and second paths, respectively, parallel to and at an angle to a given axis on said frame, a pattern and a tracer mounted on said machine tool for relative movement therebetween in accordance with the relative movement between said holders, first and second power means for moving said movable holder along said first and second paths, respectively, said tracer controlling said second power means for movements of said movable holder along said second path according to the dictates of said pattern as said movable holder is moved along said first path in a first direction by said first power means, said tracer having a normal condition corresponding to a stationary position of said second power means, and said tracer having forward and reverse conditions corresponding to forward and reverse movements, respectively, of said second power means, and means for urging said tracer in said forward condition to thus condition said second power means to drive said movable holder forwardly toward the other of said holders, the provision of a control system including, a second pattern, means for mounting said second pattern in a fixed and physically spaced relationship relative to said first pattern and intercepting a given path, means for selecting a given speed of said movable holder in said first direction along said first path, reversing means actuated in accordance with movement of said movable holder to reverse the direction of movement of said movable holder along said first path, means actuated by said reversing means to establish the speed of movement of said movable holder in said reverse direction along said first path greater than said given speed, the initial portion of said reverse movement removing said tracer from scanning relationship with said first pattern, said urging means continuing to act in the same sense as previously and hence the combination of forward movement along said second path and the initial reverse movement along said first path establishing a resultant movement along said given path to bring said tracer into scanning relationship with said second pattern, said tracer in scanning relationship wth said second pattern controlling said second drive means through the remainder of said reverse movement.

2. In combination with a lathe having a frame, a rotatable workholder and a toolholder, said toolholder being movable on said frame along first and second paths, respectively, parallel to and at an angle to the axis of the workholder, a pattern and a tracer mounted on said lathe for relative movement therebetween in accordance with the movement of said toolholder relative to said workholder, first and second power means for moving said toolholder along said first and second paths, respectively, said tracer controlling said second power means for movements of said toolholder along said second path according to the dictates of said pattern as said toolholder is moved along said first path in a first direction by said first power means, said tracer having normal and forward conditions corresponding to zero and forward movements, respectively, of said second power means, and means for urging said tracer in said forward condition to thus condition said second power means to drive said toolholder forwardly toward said workholder, the provision of a control system including, reversing means actuated in accordance with movement of said toolholder to reverse the direction of movement of said toolholder along said first path but leaving the tracer urging means in its forward urging condition, the initial portion of said reverse movement removing said tracer from scanning relationship with said pattern, said urging means continuing to act in the same sense as previously and hence the combination of forward movement along said second path and the initial reverse movement along said first path establishing a resultant movement along a resultant path which is generally toward said pattern, and tracer control means other than said pattern for controlling said second drive means through substantially the remainder of said reverse movement.

3. In combination with a lathe having a frame, a rotatable workholder and a toolholder, said toolholder being movable on said frame along first and second paths, respectively, parallel to and at an angle to the axis of the workholder, a pattern and a tracer mounted on said lathe for relative movement therebetween in accordance with the movement of said toolholder relative to said workholder, and first and second power means for moving said toolholder along said first and second paths, respectively, said tracer controlling said second power means for movements of said toolholder along said second path according to the dictates of said pattern as said toolholder is moved along said first path in a first direction by said first power means, said tracer having a normal condition corresponding to a stationary position of said second power means, and said tracer having forward and reverse conditions corresponding to forward and reverse movements, respectively, of said second power means, means for urging said tracer in said forward condition to thus condition said second power means to drive said toolholder forwardly toward said workholder, the provision of a control system including, a second pattern, means for mounting said second pattern in a fixed and physically spaced relationship relative to said first pattern and intercepting a given path, reversing means actuated in accordance with movement of said toolholder to reverse the direction of movement of said toolholder along said first path but leaving the tracer urging means in its forward urging condition, the initial portion of said reverse movement removing said tracer from scanning relationship with said first pattern, said urging means continuing to act in the same sense as previously and hence the combination of forward movement along said second path and the initial reverse movement along said first path establishing a resultant movement along said given path to bring said tracer into scanning relationship with said second pattern, said tracer in scanning relationship with said second pattern controlling said second drive means through substantially the remainder of said reverse movement.

4. In combination with a lathe having a frame, a rotatable workholder and a toolholder, said toolholder being movable on said frame along first and second paths, respectively, parallel to and at an angle to the axis of the workholder, a pattern and a tracer mounted on said lathe for relative movement therebetween in accordance with the movement of said toolholder relative to said workholder, and first and second power means for moving said toolholder along said first and second paths, respectively, said tracer controlling said second power means for movements of said toolholder along said second path according to the dictates of said pattern as said toolholder is moved along said first path in a first direction by said first power means, said tracer having a normal condition corresponding to a stationary position of said second power means, and said tracer having forward and reverse conditions corresponding to forward and reverse movements, respectively, of said second power means, means for urging said tracer in said forward condition to thus condition said second power means to drive said toolholder forwardly toward said workholder, the provision of a control system including, a second pattern, means for mounting said second pattern in a fixed and physically spaced relationship relative to said first pattern and intercepting a given path, means for selecting a given speed of said toolholder in said first direction along said first path, reversing means actuated in accordance with movement of said toolholder to reverse the direction of movement of said toolholder along said first path, means actuated by said reversing means to establish the speed of movement of said toolholder in said reverse direction along said first path greater than said given speed, the initial portion of said reverse movement removing said tracer from scanning relationship with said first pattern, said urging means continuing to act in the same sense as previously and hence the combination of forward movement along said second path and the initial reverse movement along said first path establishing a resultant movement along said given path to bring said tracer into scanning relationship with said second pattern, said tracer in scanning relationship with said second pattern controlling said second drive means through substantially the remainder of said reverse movement.

5. In combination with a lathe having a frame, a rotatable workholder and a toolholder, said toolholder being movable on said frame along first and second paths, respectively, parallel to and at an angle to the axis of the workholder, a pattern and a tracer mounted on said lathe for relative movement therebetween in accordance with the movement of said toolholder relative to said workholder, and first and second power means for moving said toolholder along said first and second paths, respectively, said tracer controlling said second power means for movements of said toolholder along said second path according to the dictates of said pattern as said toolholder is moved along said first path in a first direction by said first power means, said tracer having a normal condition corresponding to a stationary position of said second power means, and said tracer having forward and reverse conditions corresponding to forward and reverse movements, respectively, of said second power means, means for urging said tracer in said forward condition to thus condition said second power means to drive said toolholder forwardly toward said workholder, the provision of a control system including, a second pattern, means for mounting said second pattern in a fixed and physically spaced relationship relative to said first pattern, said tracer being capable of scanning said first pattern on first and second surfaces parallel, respectively, to said first and second paths, said second pattern having a scannable surface substantially parallel to said first path, means for positioning said scannable surface of said second pattern on a given path between said first and second surfaces of said first pattern, reversing means actuated in accordance with movement of said toolholder to reverse the direction of movement of said toolholder along said first path, the initial portion of said reverse movement removing said tracer from scanning relationship with said first pattern, said urging means continuing to act in the same sense as previously and hence the combination of forward movement along said second path and the initial reverse movement along said first path establishing a resultant movement along said given path to bring said tracer into scanning relationship with said second pattern, said tracer in scanning relationship with said second pattern controlling said second drive means through the remainder of said reverse movement.

6. In combination with a lathe having a frame, a rotatable workholder and a toolholder, said toolholder being movable on said frame along first and second paths, respectively, parallel to and at an angle to the axis of the workholder, a pattern and a tracer mounted on said lathe for relative movement therebetween in accordance with the movement of said toolholder relative to said workholder, and first and second power means for moving said toolholder along said first and second paths, respectively, said tracer controlling said second power means for movements of said toolholder along said second path according to the dictates of said pattern as said toolholder is moved along said first path in a first direction by said first power means, said tracer having a normal condition corresponding to a stationary position of said second power means, and said tracer having forward and reverse conditions corresponding to forward and reverse movements, respectively, of said second power means, means for urging said tracer in said forward condition to thus condition said second power means to drive said toolholder forwardly toward said workholder, the provision of a control system including, a second pattern, means for mounting said second pattern in a fixed and physically spaced relationship relative to said first pattern, said tracer being capable of scanning said first pattern on first and second surfaces parallel, respectively, to said first and second paths, said second pattern having a scannable surface substantially parallel to said first path, means for positioning said scannable surface of said second pattern on a given path between said first and second surfaces of said first pattern, means for selecting a given speed of said toolholder in said first direction along said first path, reversing means actuated in accordance with movement of said toolholder to reverse the direction of movement of said toolholder along said first path, means actuated by said reversing means to establish the speed of movement of said toolholder in said reverse direction along said first path greater than said given speed, the initial portion of said reverse movement removing said tracer from scanning relationship with said first pattern, said urging means continuing to act in the same sense as previously and hence the combination of forward movement along said second path and the initial reverse movement along said first path establishing a resultant movement along said given path to bring said tracer into scanning relationship with said second pattern, said tracer in scanning relationship with said second pattern controlling said second drive means through the remainder of said reverse movement.

CLARENCE JOHNSON.

References Cited in the file of this patent

UNITED STATES PATENTS

| Number | Name | Date |
| --- | --- | --- |
| 340,288 | Codling | Apr. 20, 1886 |
| 549,006 | Norton | Oct. 29, 1894 |
| 766,456 | Meyers | Aug. 2, 1904 |
| 1,244,664 | Warren | Oct. 30, 1917 |
| 2,002,933 | Buell | May 28, 1935 |
| 2,146,157 | Salisbury | Feb. 7, 1939 |
| 2,345,218 | Rosen | Mar. 28, 1944 |
| 2,388,545 | Horak | Nov. 6, 1945 |
| 2,399,806 | Johnson | May 7, 1946 |
| 2,433,027 | Casella | Dec. 23, 1947 |
| 2,436,373 | Barnes | Feb. 24, 1948 |
| 2,437,570 | Von Zelewsky | Mar. 9, 1948 |
| 2,540,323 | Cross | Feb. 6, 1951 |